United States Patent
Kaliner (10) Patent No.: US 10,271,271 B2
(45) Date of Patent: Apr. 23, 2019

(54) DYNAMICALLY INFLUENCING THE CHOICE OF A MOBILE NETWORK OPERATOR PROFILE USED BY A USER EQUIPMENT COMPRISING AN EMBEDDED IDENTITY MODULE

(71) Applicant: DEUTSCHE TELEKOM AG, Bonn (DE)

(72) Inventor: Stefan Kaliner, Koenigswinter (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/102,296

(22) PCT Filed: Jan. 15, 2015

(86) PCT No.: PCT/EP2015/050677
§ 371 (c)(1),
(2) Date: Jun. 7, 2016

(87) PCT Pub. No.: WO2015/110345
PCT Pub. Date: Jul. 30, 2015

(65) Prior Publication Data
US 2017/0041864 A1 Feb. 9, 2017

(30) Foreign Application Priority Data
Jan. 27, 2014 (EP) .................................. 14152685

(51) Int. Cl.
*H04W 48/18* (2009.01)
*H04W 8/20* (2009.01)
(Continued)

(52) U.S. Cl.
CPC ........... *H04W 48/18* (2013.01); *H04W 8/205* (2013.01); *H04W 48/08* (2013.01); *H04W 88/06* (2013.01)

(58) Field of Classification Search
CPC ....... H04W 48/18; H04W 88/06; H04W 8/20; H04W 8/205; H04W 48/08;
(Continued)

(56) References Cited

U.S. PATENT DOCUMENTS 6,690,929 B1 * 2/2004 Yeh ........................ H04M 15/46
379/114.01
2002/0068566 A1 * 6/2002 Ohlsson ................ H04W 36/18
455/436
(Continued)

FOREIGN PATENT DOCUMENTS

EP  2530920 A1  12/2012
EP  2900015 A1 *  7/2015  ............ H04W 48/18
(Continued)

*Primary Examiner* — Matthew C Sams
(74) *Attorney, Agent, or Firm* — Leydig, Voit & Mayer, Ltd.

(57) ABSTRACT

A method for dynamically influencing the choice of a mobile network operator profile used by a user equipment connected to a telecommunications network includes: defining a plurality of trigger events and determining a switching probability for each trigger event, wherein the user equipment switches from the first mobile network operator profile to the second mobile network operator profile if the switching probability exceeds a predefined threshold. A switching related information is transmitted to the user equipment, the switching related information corresponding to information related to either a modification of the first mobile network operator profile, or to a modification of the second mobile network operator profile.

6 Claims, 3 Drawing Sheets

(51) Int. Cl.
*H04W 48/08* (2009.01)
*H04W 88/06* (2009.01)

(58) Field of Classification Search
CPC .............. H04L 41/5025; H04L 67/306; H04M 15/8016; H04M 15/81; H04M 2215/0112; H04M 2215/2026; H04M 2215/32; H04M 15/80; H04M 15/805; H04M 15/8083
See application file for complete search history.

(56) References Cited

U.S. PATENT DOCUMENTS

| | | | | |
|---|---|---|---|---|
| 2002/0068571 A1* | 6/2002 | Ohlsson | ................ | H04W 36/18 455/442 |
| 2005/0239498 A1* | 10/2005 | Dorenbosch | .......... | H04W 76/02 455/552.1 |
| 2006/0172773 A1 | 8/2006 | Morishita et al. | | |
| 2006/0217112 A1* | 9/2006 | Mo | ........................ | H04W 36/14 455/422.1 |
| 2007/0156804 A1* | 7/2007 | Mo | ........................ | H04W 8/02 709/200 |
| 2007/0259646 A1 | 11/2007 | Hu et al. | | |
| 2009/0325581 A1 | 12/2009 | Lu et al. | | |
| 2010/0240391 A1* | 9/2010 | Povey | ....................... | G01S 5/14 455/456.1 |
| 2011/0053596 A1* | 3/2011 | Wohlert | ................ | H04W 36/04 455/436 |
| 2011/0165872 A1 | 7/2011 | Ohno et al. | | |
| 2012/0322497 A1* | 12/2012 | Navda | ............. | H04W 36/00837 455/525 |
| 2013/0273914 A1* | 10/2013 | Speks | ................... | H04W 48/18 455/435.1 |
| 2014/0066117 A1* | 3/2014 | Egner | ................... | H04W 4/003 455/513 |

FOREIGN PATENT DOCUMENTS

| | | | | |
|---|---|---|---|---|
| JP | 2006295684 A | 10/2006 | | |
| WO | WO 2005011295 A2 | 2/2005 | | |
| WO | WO 2006075399 A1 | 7/2006 | | |
| WO | WO 2013174388 A1 | 11/2013 | | |
| WO | WO 2015110345 A1 * | 7/2015 | ............ | H04W 48/18 |

* cited by examiner

DYNAMICALLY INFLUENCING THE CHOICE OF A MOBILE NETWORK OPERATOR PROFILE USED BY A USER EQUIPMENT COMPRISING AN EMBEDDED IDENTITY MODULE

CROSS-REFERENCE TO RELATED APPLICATIONS

This application is a U.S. National Phase application under 35 U.S.C. § 371 of International Application No. PCT/EP2015/050677, filed on Jan. 15, 2015, and claims benefit to European Patent Application No. EP 14152685.5, filed on Jan. 27, 2014. The International Application was published in English on Jul. 30, 2015 as WO 2015/110345 A1 under PCT Article 21(2).

FIELD

The present invention relates inter alia to a method for dynamically influencing the choice of a mobile network operator profile used by a user equipment connected to a telecommunications network, wherein the user equipment comprises an embedded identity module, wherein a plurality of mobile network operator profiles (but only one at a time) are able to be used by the user equipment.

Furthermore, the present invention relates to a system and method within a telecommunications network for dynamically influencing the choice of a mobile network operator profile used by a user equipment connected to a telecommunications network, wherein the user equipment comprises an embedded identity module, wherein a plurality of mobile network operator profiles (but only one at a time) are able to be used by the user equipment.

Additionally, the present invention relates to a function and method within a user equipment for dynamically influencing the choice of a mobile network operator profile used by the user equipment connected to a telecommunications network, wherein the user equipment comprises an embedded identity module, wherein a plurality of mobile network operator profiles (but only one at a time) are able to be used by the user equipment.

Furthermore, the present invention relates to a program comprising a computer readable program code, and to a computer program product for using a telecommunications network.

BACKGROUND

In the future, mobile devices will utilize an embedded identity module such as an eSIM (embedded Subscriber Identity Module) or an eUICC (embedded Universal Integrated Circuit Card). Embedded identity modules (such as an embedded SIM (Subscriber identity module) or an eUICC (embedded Universal Integrated Circuit Card) allow consumers to dynamically switch the active representation of Mobile Network Operators (profiles) in their devices to optimize their MNO selection for their current situation. This contrasts with today's typical situation, where users are usually tied to a single SIM profile (or at most two in dual SIM mobile devices) which will usually correspond to a single or at most two MNOs.

SUMMARY

In an embodiment, the invention provides a method for dynamically influencing the choice of a mobile network operator profile used by a user equipment connected to a telecommunications network. The user equipment comprises an embedded identity module, wherein a plurality of mobile network operator profiles are able to be used by the user equipment. The plurality of mobile network operator profiles comprises at least a first mobile network operator profile and a second mobile network operator profile. The method comprises the following steps: defining a plurality of trigger events and determining a switching probability for each trigger event, the switching probability for a trigger event of the plurality of trigger events corresponding to the probability for the user equipment to switch from the first mobile network operator profile to the second mobile network operator profile, wherein the user equipment switches from the first mobile network operator profile to the second mobile network operator profile if the switching probability exceeds a predefined threshold, the switching probability and the plurality of trigger events depending on at least one switching parameter associated to the user equipment, wherein the switching parameter depends on the user's contextual needs and/or the user's history of network switching; and a switching related information is transmitted to the user equipment, the switching related information corresponding to information related to either a modification of the first mobile network operator profile, or to a modification of the second mobile network operator profile, the switching related information being aimed at either inducing the user equipment to switch from the first mobile network operator profile to the second mobile network operator profile or aimed at preventing the user equipment from switching from the first mobile network operator profile to the second mobile network operator profile, wherein the switching related information corresponds to information regarding modified connection conditions and/or applicable tariffs

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

As a result of the dynamic switching of SIM profiles, it will become much easier for users to switch MNOs according to their connection and pricing needs. Consequentially, MNOs will need new technically enabled approaches to retain users in this competitive environment.

In an embodiment, the invention provides a method for dynamically influencing the choice of a mobile network operator used by a user equipment connected to a telecommunications network, wherein the user equipment comprises an embedded identity module, and wherein a plurality of mobile network operator profiles are able to be used by the user equipment, such that operational costs are reduced, revenues increased, and the service level of the current mobile telecommunications network operator to that particular user equipment preserved or extended or handed over to an affiliate mobile network operator or taken over by another mobile network operator.

In an embodiment, the invention provides a method for dynamically influencing the choice of a mobile network operator profile used by a user equipment connected to a telecommunications network, wherein the user equipment comprises an embedded identity module, wherein a plurality of mobile network operator profiles are able to be used by the user equipment, wherein the plurality of mobile network operator profiles comprises at least a first mobile network operator profile and a second mobile network operator profile, wherein the method comprises the following steps:

defining a plurality of trigger events and determining a switching probability for each trigger event, the switching probability corresponding to the probability for the user equipment to switch from the first mobile network operator profile to the second mobile network operator profile, the switching probability and the plurality of trigger events depending on at least one switching parameter associated to the user equipment, a switching related information is transmitted to the user equipment, the switching related information corresponding to an information related to either a modification of the first mobile network operator profile or of service parameters related thereto, or to a modification of the second mobile network operator profile or of service parameters related thereto, the switching related information being aimed at either inducing the user equipment to switch from the first mobile network operator profile to the second mobile network operator profile or aimed at preventing the user equipment to switch from the first mobile network operator profile to the second mobile network operator profile.

According to the present invention it is thereby advantageously possible that user equipments that are equipped with embedded identity modules (such as an eSIM (embedded Subscriber Identity Module) or an eUICC (embedded Universal Integrated Circuit Card)), allow consumers, in some cases through an Over-The-Top (OTT) Subscription Manager, to dynamically switch the active representation of Mobile Network Operators (profiles) in their devices to optimize their mobile network operator selection for their current situation.

A geographical area where the dynamic switching of mobile network operator profiles (or SIM profiles) is particularly important is when users approach a territorial border (i.e. a border that is also a border of the telecommunications network), especially a national border, from which a roaming charge would usually start. In this instance, it is likely that a user switches to another mobile network operator profile that represents a mobile network operator of the new country or, if such is not yet present on their eUICC, rival mobile network operators (possibly via an OTT Subscription Manager) will push new mobile network operator profiles (or SIM profiles) to a user to try and entice them away from their existing mobile network operator.

Accordingly, an aspect of the present invention is how to anticipate a user's likely future network needs and the probability of a network switch, and based on this compute a new or modify an existing mobile network operator profile (or SIM profile) for a new mobile network operator and then encourage the user to take advantage of this opportunity or pre-empt the threat of a new mobile network operator with a countermeasure to try to ensure loyalty to the current mobile network operator which is associated with the current mobile network operator profile (or SIM profile).

Hence, the dynamic switching of mobile network operator profiles presents both a potential threat and an opportunity for mobile network operators. By being able to pre-empt when users are approaching critical "trigger" points on a route where there is a significant divergence between a user's current and alternative network characteristics, it is possible to implement technical countermeasures to enhance customer retention, or implement technical incentives to increase the likelihood of switching mobile network operator.

In an embodiment of the present invention, a mobile network operator switch threat is determined. The mobile network operator switch threat for a user equipment is typically determined by establishing a location and/or a trajectory of the user equipment. From this, the likely future route of the user equipment is determined. Points on the route are determined which represent potential trigger points for a network switch opportunity—for example, a transition across a national border when a user would start to incur roaming charges or a transition into an area where a required service is no longer available. It is especially advantageous that according to the present invention, geo-specific threat trigger points are identified where there is a risk of a switch of the mobile network operator by the user equipment. The magnitude of the threat for trigger points, i.e. where there is a risk of a mobile network operator switch, along the route is filtered, such that only those trigger points which represent a significant risk of a network switch are onward processed.

According to a further embodiment of the present invention, a mobile network operator switch opportunity is determined. The mobile network operator switch opportunity for a user equipment is typically determined by establishing a location and/or a trajectory of a user equipment. From this, their likely future route is determined. Points on the route are determined which represent potential trigger points for a Network Switch opportunity—for example, a transition across a national border when a user would start to incur roaming charges or a transition into an area where a required service is no longer available. It is especially advantageous that according to the present invention, geo-specific opportunity trigger points are identified where there is an opportunity of a switch of the mobile network operator by the user equipment. The magnitude of the opportunity for trigger points, i.e. where there is a probability for the user equipment that service needs are better met after a mobile network operator switch, along the route is filtered such that only those trigger points which represent a significant opportunity of a network switch are onward processed.

According to a further embodiment of the present invention, a mobile network operator switch countermeasure is determined. The mobile network operator switch countermeasure determines network service characteristics along a route taken by the user equipment, and compares those to the network service characteristics currently available to the user. A new network service characteristic for the existing network of the user equipment is computed to reduce the risk of the user equipment switching the mobile network operator. The existing SIM profile is updated accordingly or the new network service characteristic is applied as a new tariff when the trigger point identified in the Network Switch Threat is reached. It is especially advantageous that according to the present invention that a countermeasure to mobile network operator switch threat is computed such that the risk of the user switching to a new mobile network operator is reduced.

According to still another further embodiment of the present invention, a mobile network operator switch incentive is determined. The mobile network operator switch incentive determines network service characteristics along a route taken by the user, and compares to the network service characteristics currently available to the user. A tailored network service characteristic for a new mobile network operator is computed to incentivize the user equipment (or its user) to switch the mobile network operator. This is downloaded as a new mobile network operator profile with a suitable tariff offer when the trigger point identified in the network switch opportunity is reached. It is especially advantageous that according to the present invention, an incentive for the mobile network operator switch opportunity is computed such that the user equipment (or its user) is incentivized to switch to a new mobile network operator, i.e. using a new mobile network operator profile.

The present invention refers to all kinds of telecommunications network, especially mobile telecommunications networks, such as 2G, 3G and/or 4G telecommunications networks. The term 2G access relates to second generation mobile telecommunications networks and corresponding user equipments, typically denoted by the GSM standard (Global System for Mobile communication). The term 3G access relates to third generation mobile telecommunications network and corresponding user equipments, typically denoted by the UMTS standard (Universal Mobile Telecommunication System). The term 4G access relates to fourth generation mobile telecommunications network and corresponding user equipments, typically denoted by the LTE standard (Long Term Evolution).

According to the present invention, it is preferred that a plurality of trigger events is determined and for each trigger event a related switching probability is determined.

Thereby it is advantageously possible that based on the switching probability being above a predefined threshold, actions are triggered such that the user equipment is either incentivized to switch to another mobile network operator profile or prevented to switch to another mobile network operator profile.

Furthermore, it is preferred according to the present invention that the switching probability depends
  on the geographic location of the user equipment or
  on the geographic location of the user equipment and on the direction of travel of the user equipment.

Thereby, it is advantageously possible according to the present invention that trigger situations can be easily determined.

According to the present invention, it is preferred that at least part of the trigger events of the plurality of trigger events correspond to the user equipment approaching and/or being close to
  a border of the coverage area of the telecommunications network and/or
  a territorial border, especially a national and/or regional border.

Furthermore, it is preferred that the switching related information corresponds to information to the user of the user equipment regarding modified connection conditions and/or applicable tariffs.

It is thereby advantageously possible that the user of the user equipment is able to decide about a switch of the mobile network operator profile related to a different pricing model and/or related to a different service level.

The present invention also relates to a telecommunications network for dynamically influencing the choice of a mobile network operator profile used by a user equipment connected to the telecommunications network, wherein the user equipment comprises an embedded identity module, wherein a plurality of mobile network operator profiles are able to be used by the user equipment, wherein the plurality of mobile network operator profiles comprises at least a first mobile network operator profile and a second mobile network operator profile, wherein the telecommunications network is configured such that:
  a plurality of trigger events is defined and a switching probability for each trigger event is determined, the switching probability corresponding to the probability for the user equipment to switch from the first mobile network operator profile to the second mobile network operator profile, the switching probability for the plurality of trigger events depending on at least one switching parameter associated to the user equipment,
  a switching related information is transmitted, by the telecommunications network, to the user equipment, the switching related information corresponding to an information related to either a modification of the first mobile network operator profile or of service parameters related thereto, or to a modification of the second mobile network operator profile or of service parameters related thereto, the switching related information being aimed at either inducing the user equipment to switch from the first mobile network operator profile to the second mobile network operator profile or aimed at preventing the user equipment to switch from the first mobile network operator profile to the second mobile network operator profile.

Furthermore, it is preferred—with respect to the telecommunications network—that a plurality of trigger events is determined and for each trigger event a related switching probability is determined.

Additionally according to the present invention, it is preferred—with respect to the telecommunications network—that the switching probability depends
  on the geographic location of the user equipment or
  on the geographic location of the user equipment and on the direction of travel of the user equipment.

According to the present invention, it is preferred—with respect to the telecommunications network—that at least part of the trigger events of the plurality of trigger events correspond to the user equipment approaching and/or being close to
  a border of the coverage area of the telecommunications network and/or
  a territorial border, especially a national and/or regional border.

Additionally, the present invention relates to a user equipment for dynamically influencing the choice of a mobile network operator profile used by the user equipment connected to a telecommunications network, wherein the user equipment comprises an embedded identity module, wherein a plurality of mobile network operator profiles are able to be used by the user equipment, wherein the plurality of mobile network operator profiles comprises at least a first mobile network operator profile and a second mobile network operator profile, wherein the user equipment is configured such that:

a plurality of trigger events is defined and a switching probability for each trigger event is determined, the switching probability corresponding to the probability for the user equipment to switch from the first mobile network operator profile to the second mobile network operator profile, the switching probability and the plurality of trigger events depending on at least one switching parameter associated to the user equipment, a switching related information is received by the user equipment, the switching related information corresponding to an information related to either a modification of the first mobile network operator profile or of service parameters related thereto, or to a modification of the second mobile network operator profile or of service parameters related thereto, the switching related information being aimed at either inducing the user equipment to switch from the first mobile network operator profile to the second mobile network operator profile or aimed at preventing the user equipment to switch from the first mobile network operator profile to the second mobile network operator profile.

Furthermore, the present invention relates to a program comprising a computer readable program code which, when executed on a computer or on a network node of a telecommunications network or on a user equipment or partially on a network node of the telecommunications network and partially on a user equipment, causes the computer or the network node of the telecommunications network or the user equipment to perform operations discussed herein.

The present invention also relates to computer program product for using a telecommunications network, the computer program product comprising a computer program stored on a storage medium, the computer program comprising program code which, when executed a computer or on a network node of a telecommunications network or on a user equipment or partially on a network node of the telecommunications network and partially on a user equipment, causes the computer or the network node of the telecommunications network or the user equipment to perform operations discussed herein.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 7:
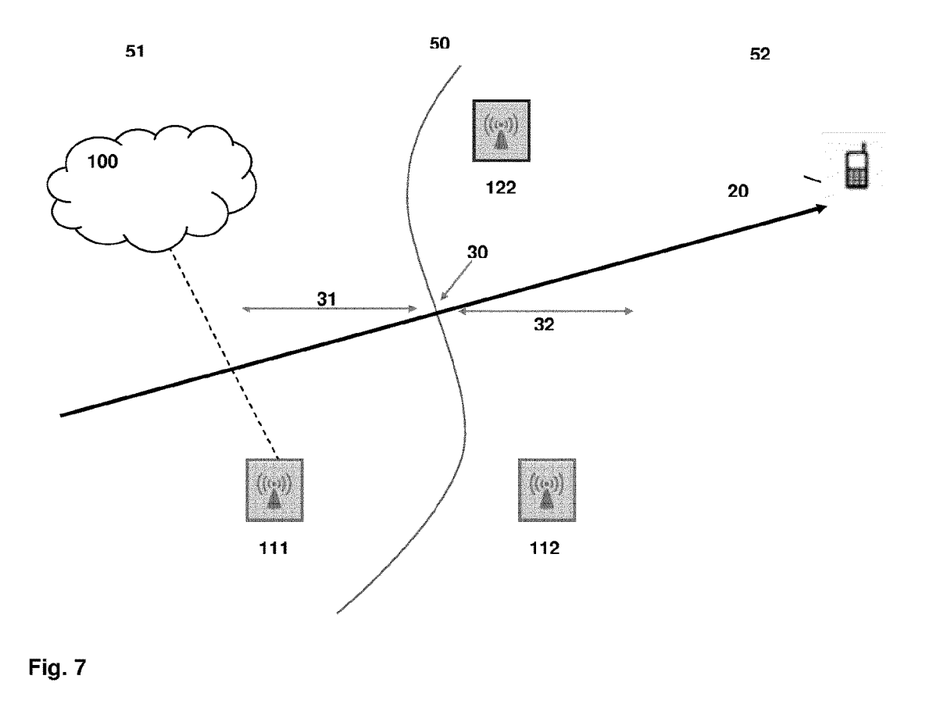
FIG. 7 schematically illustrates an exemplary environment for exemplary embodiments of the invention.

In FIG. 7, a typical situation for the application of the method according to the present invention is schematically shown. A user equipment 20 moves between a first region 51 and a second region 52. A border 50, especially a territorial border and/or a regional border and/or a national border and/or a service coverage border, separates the first region 51 from the second region 52. The user equipment 20 is connected to a telecommunications network 100. In the first region 51, a first mobile network operator 111 is offering its services. In the second region 52 exist a second mobile network operator 112 and a third mobile network operator 122 is operating (either the same telecommunications network 100 or a part connected to the telecommunications network 100 or a different telecommunications network (not shown)). In the exemplary use case illustrated in FIG. 7, the user equipment user equipment 20 moves from the first region 51 to the second region 52 along a schematically illustrated trajectory represented by a bold arrow stretching slightly inclined towards the right hand part of the illustration. Each mobile network operator 111, 112, 122 corresponds to a different mobile network operator profile on the embedded identity module within the user equipment that can be selected by the user equipment 20. Reference sign 30 corresponds to a trigger point, i.e. a geographical point where a trigger event occurs, i.e. the switching probability typically exceeds a predefined threshold.

In FIG. 7, the following assumptions may apply: the second mobile network operator 112 is an affiliate of the first mobile network operator profile 111. The third mobile network operator 122 has an LTE access network (4G network). An OTT Subscription Manager Z has agreements with the first, second, and third mobile network operator 111, 112, 122 and the user equipment 20.

According to a first use case, user equipment 20 is in the first region 51 and has a trajectory which is likely to take it to the second region 52. The user equipment 20 corresponds to a mobile device 20 having an embedded identity module (e.g. an eUICC) where the first mobile network operator 111 is present and selected and the second, and third mobile network operators 112, 122 are present but not selected. The route of the user equipment 20 will take it into the second region 52. The second region 52 would usually incur roaming charges if the user equipment 20 remains with the first mobile network operator 111. Accordingly, as the user equipment 20 approaches the border 50 between the first region 51 and the second region 52 (which represents a trigger point due to the difference in network characteristics between the first mobile network operator 111 and alternatives), there is a high risk that the user equipment 20 (hence its user or subscriber) will switch to the second or third mobile network operator 112 or 122 in the second region 52 so as to avoid roaming charges. According to the present invention, the trajectory of the user equipment 20 is detected by the first mobile network operator 111, and using either general historical data (i.e. generated concerning a plurality of user equipments) and/or specific historical data (i.e. specific to the user equipment 20), as well as current context, the threat represented by the risk of switching to a new mobile network operator is computed for each potential trigger point, including the border 50. As the user equipment 20 approaches the border area, the threat for the border trigger point exceeds a (predefined) threshold level. The first mobile network operator 111 computes the countermeasure and makes an offer to retain the user of user equipment 20. If the user of the user equipment 20 accepts the offer, the first mobile network operator 111 updates the tariff according to the offer. The user equipment 20 crosses the border without switching to the second or third mobile network operator 112 or 122. Accordingly, mobile network operator 111 keeps the revenue out of the continued usage of the user equipment 20.

According to a second use case, the user equipment 20 is in the first region 51 and has a trajectory which is likely to take it to the second region 52. The user equipment 20 corresponds to a mobile device 20 having an embedded identity module (e.g. an eUICC) where the first mobile network operator 111 is present and selected and the second, and third mobile network operators 112, 122 are present but not selected. The route of the user equipment 20 will take it into the second region 52. The second region 52 would usually incur roaming charges if the user equipment 20 remains with the first mobile network operator 111. Accordingly, as the user equipment 20 approaches the border 50 between the first region 51 and the second region 52 (which represents a trigger point due to the difference in network characteristics between the first mobile network operator 111 and alternatives), there is a high risk that the user equipment 20 (hence its user or subscriber) will switch to the second or third mobile network operator 112 or 122 in the second region 52 so as to avoid roaming charges. According to the present invention, the trajectory of the user equipment 20 is detected by the first mobile network operator 111, and using either general historical data (i.e. generated concerning a plurality of user equipments) and/or specific historical data (i.e. specific to the user equipment 20), as well as current context, the threat represented by the risk of switching to a new mobile network operator is computed for each potential trigger point, including the border 50. As the user equipment 20 approaches the border area, the threat for the border trigger point exceeds a (predefined) threshold level. The first mobile network operator 111 computes the offer most likely to retain the user of user equipment 20, and communicates this information to the second mobile network operator 112, which is an affiliate in the second region 52 of the first mobile network operator 111. The second mobile network operator 112 provides an offer or incentive to the user who may accept the offer or incentive and switch to the second mobile network operator 112 (i.e. deselecting the first mobile network operator 111 and selecting the second mobile network operator 112) after crossing the border. Alternatively, if the second mobile network operator 112 is not yet present on the eUICC of the user equipment 20, the second mobile network operator 112 creates a new mobile network operator profile (or SIM profile) to better match the needs of the user of the user equipment 20, and pushes this mobile network operator profile to the user equipment 20. The second mobile network operator 112 provides an offer or incentive to the user of user equipment 20, who may accept the offer and switch to the second mobile network operator 112 (by deselecting the first mobile network operator 111, and by selecting the second mobile network operator 112 on the embedded identity module, typically an eUICC) after crossing the border 50.

According to a third use case, the user equipment 20 is in the first region 51 and has a trajectory which is likely to take it to the second region 52. The user equipment 20 corresponds to a mobile device 20 having an embedded identity module (e.g. an eUICC) where the first mobile network operator 111 is present and selected and the second, and third mobile network operators 112, 122 are present but not selected. The user of user equipment 20 is also subscribed to a OTT (Over The Top)-subscription manager where it has been selected to use a "cheapest call" option which aims to switch mobile network operators on the embedded identity module of the user equipment 20 (typically an eUICC) to provide the lowest calling costs. In the first region 51, the first mobile network operator 111 is selected by the OTT-subscription manager as offering the lowest calling cost in the context of the needs of the user of the user equipment 20. However, the route of the user equipment 20 will take it into the second region 52. The second region 52 would usually incur roaming charges if the user equipment 20 remains with the first mobile network operator 111. Accordingly, as the user equipment 20 approaches the border 50 between the first region 51 and the second region 52, there is an opportunity—as the user of the user equipment 20 uses the OTT-subscription manager with "cheapest call" option—to switch to the second or third mobile network operator 112 or 122 in the second region 52 so as to avoid roaming charges. According to the present invention, the trajectory of the user equipment 20 is detected by the OTT subscription manager, and using either general historical data (i.e. generated concerning a plurality of user equipments) and/or specific historical data (i.e. specific to the user equipment 20), as well as current context, the incentive needed to switch the user equipment 20 to a new mobile network operator is computed based on the opportunities which are available (i.e. the availability of the second and/or third mobile network operator 112, 122). As the user equipment 20 approaches the border area, the opportunity exceeds a (predefined) threshold level at the trigger point which is on the border 50 and OTT subscription manager remotely switches the user equipment 20 (or the embedded identity module such as the eUICC) to the second mobile network operator 112 or the third mobile network operator 122, whichever offers the lowest calling costs in the given context. Alternatively, if the second mobile network operator 112 or the third mobile network operator 122 is not yet present on the eUICC of the user equipment 20, the OTT subscription manager triggers the second mobile network operator 112 or the third mobile network operator 122 to push a new mobile network operator profile to the user equipment 20 as the user equipment 20 crosses the border 50. The OTT subscription manager notifies the user equipment 20, and then remotely switches the eUICC of the user equipment 20 to the second mobile network operator 112 or to the third mobile network operator 122, whichever offers the lowest calling costs in the given situation.

According to a fourth use case, the user equipment 20 is in the first region 51 and has a trajectory which is likely to take it to the second region 52. The user equipment 20 corresponds to a mobile device 20 having an embedded identity module (e.g. an eUICC) where the first mobile network operator 111 is present and selected and the second, and third mobile network operators 112, 122 are present but not selected. The user of user equipment 20 is also subscribed to a OTT (Over The Top)-subscription manager where it has been selected to use a "best performance" option which aims to switch mobile network operators on the embedded identity module of the user equipment 20 (typically an eUICC) to provide the best performance for the applications which the user of the user equipment 20 is executing. For example, the user may play online games on the user equipment 20, which typically have extremely high bandwidth and short latency needs. In the first region 51, the first mobile network operator 111 is selected by the OTT-subscription manager as offering the best performance in the context of the needs of the user of the user equipment 20. However, the route of the user equipment 20 will take it into the second region 52. Accordingly, as the user equipment 20 approaches the border 50 between the first region 51 and the second region 52, there is an opportunity—as the user of the user equipment 20 uses the OTT-subscription manager with "best performance" option—to switch to the second or third mobile network operator 112 or 122 in the second region 52 if either of these mobile network operators can offer an improved level of performance compared to the first mobile network operator 111. According to the present invention, the trajectory of the user equipment 20 is detected by the OTT subscription manager, and using either general historical data (i.e. generated concerning a plurality of user equipments) and/or specific historical data (i.e. specific to the user equipment 20), as well as current gaming context, the incentive needed to switch the user equipment 20 to a new mobile network operator is computed based on the opportunities which are available (i.e. the availability of the second and/or third mobile network operator 112, 122). As the user equipment 20 approaches the border area, the opportunity presented by the LTE network of the third mobile network operator 122 exceeds a (predefined) threshold level at the trigger point which is on the border 50 and OTT subscription manager remotely switches the user equipment 20 (or the embedded identity module such as the eUICC) to the third mobile network operator 122. Alternatively, if the third mobile network operator 122 is not yet present on the eUICC of the user equipment 20, the OTT subscription manager triggers the third mobile network operator 122 to push a new mobile network operator profile to the user equipment 20 as the user equipment 20 crosses the border 50. The OTT subscription manager notifies the user equipment 20, and then remotely switches the eUICC of the user equipment 20 to the third mobile network operator 122.

Figure 1:
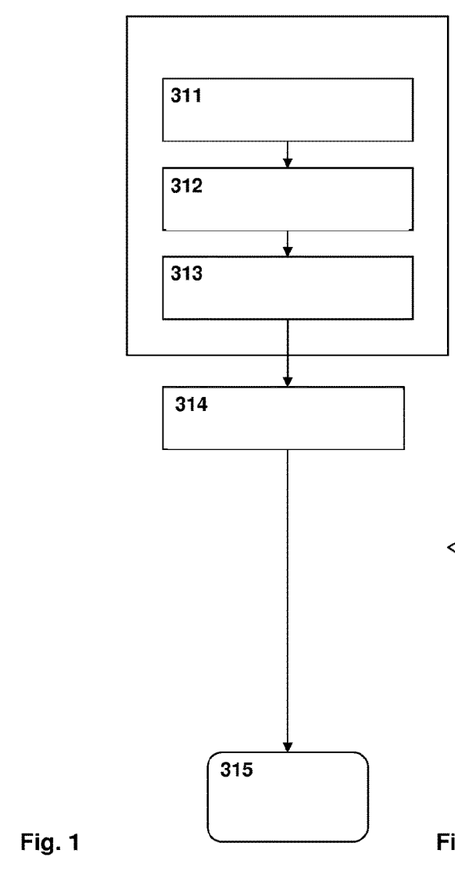
FIG. 1 schematically illustrates a flow diagram for a first exemplary embodiment.

In FIG. 1, a flow diagram for a first exemplary embodiment is schematically shown. The first exemplary embodiment is typically applied by the mobile network operator currently being used by the user equipment 20 (i.e. the user equipment 20 uses the mobile network operator profile corresponding to the mobile network operator). In this instance the mobile network operator wishes to estimate the threat level of the user equipment 20 switching to a new mobile network operator, i.e. to a new (or second) mobile network operator profile, and put in place countermeasures to offset the threat. In a first processing step 311, a switch threat level for the current mobile network operator (i.e. the first mobile network operator profile) is determined, i.e. the probability of the user equipment 20 switching away from the current mobile network operator.

A network switch threat is where the characteristics associated with a mobile network operator belonging to another mobile network operator along the route indicated by the detected trajectory of the user equipment 20 may offer a benefit to the user of the user equipment 20 given the preferences or contextual service needs (of that user). After the threat has been evaluated, a countermeasure is computed based on an associated trigger point in a second processing step 312.

The Network Switch Countermeasure is an offer (communicated in a third processing step 313) used by the current (or first) mobile network operator, and has the aim of better matching the characteristics of the current network to the user, so that the user of the user equipment 20 is discouraged from switching to another mobile network operator. The countermeasure offer is communicated to the user of the user equipment 20 such that, as the user passes through the trigger point, the countermeasure can be enabled such that the user's needs are better matched by the current (or first) mobile network operator (and therefore the user of the user equipment 20 is less likely to switch their eUICC to another (or second) mobile network operator). The new updated characteristics (e.g. in form of a modified mobile network operator profile) may be activated in a number of ways. These include, for example, adopting a new tariff for the user, making new network functionality available to the user (for example, a LTE access network) or increasing the user's available bandwidth. Accordingly, the outcome is an offer which may be communicated to a user, such that the likelihood of the user remaining with the current mobile network operator is increased. In case that the user of the user equipment 20 accepts the offer in a fourth processing step 314, the consequence is that the user or the user equipment 20 stays with the current (or first) mobile network operator 111 (represented by the final step 315).

It should be noted that offers made by networks may be automatically evaluated on behalf of the user where a user decision is required. Furthermore, a predictive element may be incorporated where the MNO making an offer estimates the likely offer made by other MNO's such that this information may be used in the computation of a new offer.

Figure 2:
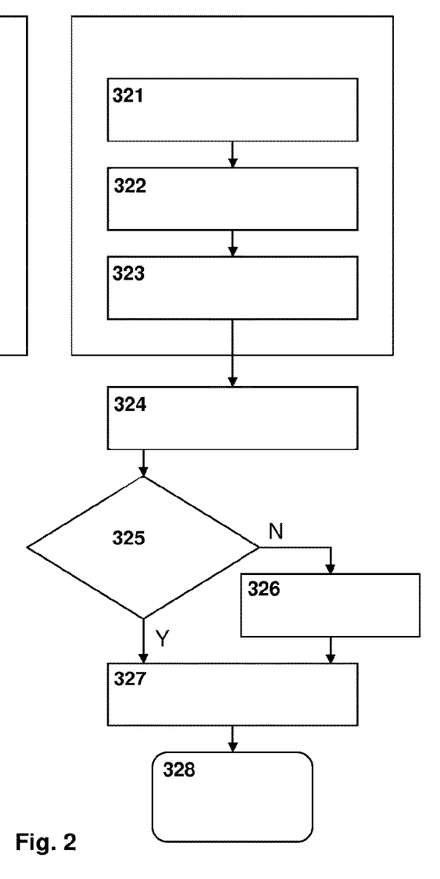
FIG. 2 schematically illustrates a flow diagram for a second exemplary embodiment.

In FIG. 2, a flow diagram for a second exemplary embodiment is schematically shown. The second exemplary embodiment is typically applied by an affiliate mobile network operator or OTT subscription manager which can offer an alternative service to the user. In this instance, the affiliate mobile network operator or OTT subscription manager wishes to determine a suitable incentive level to encourage the user equipment to switch away from the current mobile network operator (i.e. from the current (first) mobile network operator profile towards another (second) mobile network operator profile). In a first processing step 321, a switch opportunity level for the affiliate mobile network operator or OTT subscription manager is determined, i.e. the switching probability of the user equipment 20 switching away from the current mobile network operator.

A network switch opportunity is where a user (of the user equipment 20) is currently using a mobile network operator, but can achieve a better match for needs by switching to either an affiliate mobile network operator or a new mobile network operator via an OTT subscription manager. After the opportunity has been evaluated a countermeasure (or incentive) is computed based on an associated trigger point in a second processing step 322.

The Network Switch Incentive is an offer (communicated in a third processing step 323) used by the affiliate mobile network operator or by the OTT subscription manager, and has the aim of matching the characteristics of the affiliate mobile network operator or another network operator to the user so that the user of user equipment 20 is encouraged to switch to the affiliate mobile network operator or another mobile network operator. The incentive offer is communicated to the user of the user equipment 20 such that, as the user passes through the trigger point, the incentive can be enabled such that the user's needs are better matched by another mobile network operator (by applying a corresponding different mobile network operator profile). The new updated characteristics (e.g. in form of a modified mobile network operator profile) may be activated in a number of ways. These include, for example, adopting a new tariff for the user, making new network functionality available to the user (for example, a LTE access network) or increasing the user's available bandwidth. Characteristics of other networks present at the trigger point and along the user's projected route are used, together with aspects of a user profile to determine an incentive-offer to the user in advance of the trigger point. Accordingly, the outcome is an offer which may be communicated to the user of the user equipment 20, such that the likelihood of the user or user equipment 20 switching to an affiliate mobile network operator or new mobile network operator via a OTT subscription manager is increased. In case that the user of the user equipment 20 accepts the offer in a fourth processing step 324, the consequence is that the user or the user equipment 20 switches away from the current (or first) mobile network operator 111 (represented by a fifth processing step 325). In cases where an affiliate mobile network operator is available (as may occur when crossing a country border), which is already present on the user's embedded identity module, a network switch incentive, also based on individually adapted characteristics, is used to encourage the user to actively switch their embedded identity module to the affiliate mobile network operator. The presence of a profile of the affiliate mobile network operator is checked via a fifth processing step 325. If that mobile network operator is not yet present on the eUICC, a new SIM profile for the affiliated mobile network operator is pushed to the user's mobile device (during a sixth processing step 326), following which the switch of the user is executed in a seventh processing step 327. If the check regarding the presence of a profile of the affiliate mobile network operator (in the fifth processing step 325) is positive (i.e. the profile exists on the eUICC), the user switch is performed or executed in the seventh processing step 327.

In case that the user of the user equipment 20 has accepted the offer in the fourth processing step 324, the user of the user equipment 20 (or the subscription manager) uses the new (or second/third) mobile network operator 112/122 in an eight processing step 328. The consequence is that the user or the user equipment 20 is now using the affiliate mobile network operator 112 (represented by the final processing step 328).

It should be noted that offers made by networks may be automatically evaluated on behalf of the user where a user decision is required. Furthermore, a predictive element may be incorporated where the mobile network operator making an offer estimates the likely offer made by other mobile network operators such that this information may be used in the computation of a new offer.

Figure 3:
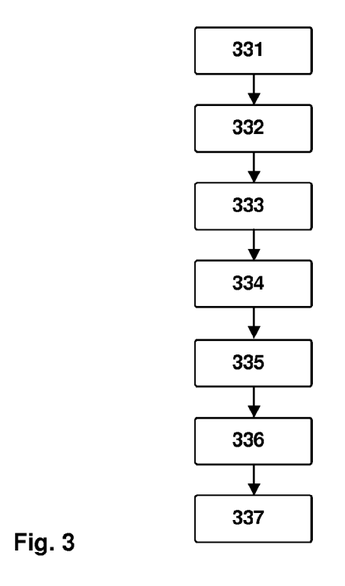
FIG. 3 schematically illustrates a flow diagram for a first part of an exemplary method.

In FIG. 3, a flow diagram for a first part of an exemplary embodiment—determining the network switch threat level or switching probability—is schematically shown, i.e. FIG. 3 is an overview of an exemplary method for determining the Network switch threat level. This functionality may be implemented by a mobile network operator profile using data collected by an application running on the user's mobile device. Provided the user's consent, their location is established (in a first processing step 331 of FIG. 3), and by measuring over time their trajectory is established which (optionally using additional information from the user's profile) is used to establish the user's likely future route. This means that in a in a second processing step 332 of FIG. 3, the history of the user equipment 20 is tracked and the likely future trajectory of the user equipment 20 is computed. Possible network connections along the user's route are determined (in a third processing step 333 of FIG. 3) using coverage information of the available networks including major characteristics, such as access technology, bandwidth, range, latency, cost, etc, as well as ownership. In a fourth processing step 334 of FIG. 3, possible network switch trigger points (national borders, etc.) are determined. Network Switch trigger points are points along the user's projected route where a Network Switch may be triggered due to differences in characteristics offered by the network conditions from different MNO's. In a fifth processing step 335 of FIG. 3, the contextual needs (bandwidth, latency, etc.) of the user of the user equipment 20 are determined. Furthermore, in a sixth processing step 336 of FIG. 3, the history of switching between mobile network operator profiles or mobile network operators is determined. In a seventh processing step 337 of FIG. 3, the network switch threat level is computed along the predicted route of the user of the user equipment 20, based on (i) presence and nature of alternative networks, (ii) presence and nature of trigger points, (iii) context, and (iv) history. The Threat Level is the likelihood of a user switching to a new mobile network operator, i.e. the switching probability to switch to another mobile network operator profile. It is computed for each trigger point along the user's route. The likelihood is determined by considering:

Characteristics of alternative MNO network connection at trigger point;

Differential between characteristics of alternative MNO network connection and current MNO network connection;

User's contextual needs;

User's history of Network Switching.

A plurality of different possible specific implementations exist. For example, a rule-based system may use a knowledge-base to define rules which are associated with varying status levels for each of the criteria being considered. An additional input may be a threshold value, which may be used to filter the results—meaning that trigger points which are unlikely to result in a Network Switch are ignored and only those that have significant risk are acted on.

Figure 4:
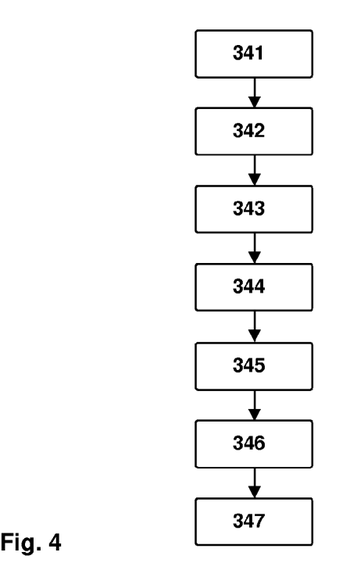
FIG. 4 schematically illustrates a flow diagram for a second part of an exemplary method.

In FIG. 4, a flow diagram of a second part of an exemplary embodiment—determining the network switch opportunity level or switching probability—is schematically shown, i.e. FIG. 4 is an overview of a possible method for determining the Network Switch Opportunity level. This functionality may be implemented by an Over-The-Top Subscription Manager using data collected by an application running on the user's mobile device. Provided the user's consent, their location is established (in a first processing step 341 of FIG. 4), and by measuring this over time their trajectory is established which (optionally using additional information from the user's profile) is used to establish the users likely future route. This means that in a in a second processing step 342 of FIG. 4, the history of the user equipment 20 is tracked and the likely future trajectory of the user equipment 20 is computed. The characteristics of the current network connection along the user's route are determined using coverage information of the available networks including major characteristics, such as access technology, bandwidth, range, latency, etc, as well as likely cost. Possible network connections along the user's route are determined (in a third processing step 343 of FIG. 4) using coverage information of the available networks including major characteristics, such as access technology, bandwidth, range, latency, cost, etc, as well as ownership. In a fourth processing step 344 of FIG. 4, possible network switch trigger points (national borders, etc.) are determined. Network Switch trigger points are points along the user's projected route where a Network Switch may be triggered due to differences in characteristics between the network of the current MNO and possible network conditions from other MNO's. In a fifth processing step 345 of FIG. 4, the contextual needs (bandwidth, latency, etc.) of the user of the user equipment 20 are determined. Furthermore, in a sixth processing step 346 of FIG. 4, the history of switching between mobile network operator profiles or mobile network operators is determined. In a seventh processing step 347 of FIG. 4, the opportunity to incentivize the user to switch to a new mobile network operator (or mobile network operator profile) is computed for each trigger point along the user's route. The nature and magnitude of the opportunity is determined by considering:

Characteristics of current mobile network operator network connection at trigger point;

Differential between characteristics of alternative mobile network operator profile network connections and current MNO network connection;

User's contextual needs;

User's history of Network Switching.

A plurality of different possible specific implementations exist. For example, a rule-based system may use a knowledge-base to define rules which are associated with varying status levels for each of the criteria being considered. An additional input may be a threshold value, which may be used to filter the results—meaning that trigger points which are unlikely to result in a Network Switch are ignored and only those that have significant risk are acted on.

Figure 5:
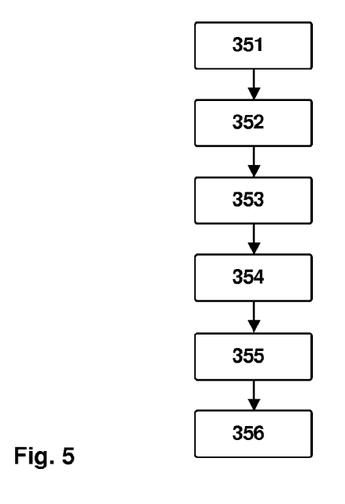
FIG. 5 schematically illustrates a flow diagram for a third part of an exemplary method.

In FIG. 5, a flow diagram of a third part of an exemplary embodiment is schematically shown, i.e. FIG. 5 illustrates the main steps for determining the network switch countermeasure. This is executed after a qualified Threat has occurred, and determines the countermeasure offer which should be offered to the user so that the characteristics of the network connection better suit their needs, and accordingly they are more likely to remain connected to their existing mobile network operator.

Again the characteristics of other networks present at the trigger point and along the user's projected route are used (during a first processing step 351 of FIG. 5, during which other potential network connection along the travelling route are established, and during a second processing step 352 of FIG. 5, during which likely characteristics of each network (using databases, web-based data-mining, etc.) are mined), together with aspects of a user profile (during a third processing step 353 of FIG. 5, the user profile is determined using, e.g., the past network switching behaviour, the context, etc.) describing past switching behaviour and any network connection relevant contextual information (such as access technology, bandwidth, latency, price, etc.) to determine a counter-offer to the user in advance of the trigger point, during a fourth processing step 354 of FIG. 5. In a fifth processing step 355 of FIG. 5, the offer is filtered and in a sixth processing step 356 of FIG. 5, the offer is communicated to the user of the user equipment 20.

There are many possible specific implementations. For example, a rule-based system may use a knowledge-base to define rules which are associated with varying status levels for each of the criteria being considered. The countermeasure may be filtered according to preferences of the mobile network operator. Then it is expressed in the form of an offer which, depending on the user's preferences, is communicated to the user for their acceptance.

To limit the probability that the user accepts the offer but—for whatever reason—still switches the mobile network operator, the offer may be limited in time or volume.

Figure 6:
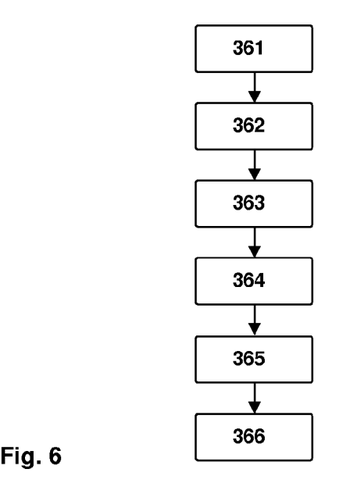
FIG. 6 schematically illustrates a flow diagram for a fourth part of an exemplary method.

In FIG. 6, a flow diagram of a fourth part of an exemplary embodiment is schematically shown, i.e. FIG. 6 illustrates the main steps for determining the network switch incentive. This is executed after a qualified opportunity has occurred, and determines the incentive offer which should be offered to the user so that the characteristics of a new network connection better suit their needs compared to their existing MNO, and accordingly they are more likely to switch to a new MNO.

Again the characteristics of other networks present at the trigger point and along the user's projected route are used (during a first processing step 361 of FIG. 6, during which other potential network connection along the travelling route are established, and during a second processing step 362 of FIG. 6, during which likely characteristics of each network (using databases, web-based data-mining, etc.) are determined), together with aspects of a user profile (during a third processing step 363 of FIG. 6, the user's behavioural profile is determined using, e.g., the past network switching behaviour, the context, etc.) describing past switching behaviour and any network connection relevant contextual information (such as access technology, bandwidth, latency, price, etc.) to determine an incentive-offer to the user in advance of the trigger point, during a fourth processing step 364 of FIG. 6. In a fifth processing step 365 of FIG. 6, the offer is filtered and in a sixth processing step 366 of FIG. 6, the offer is communicated to the user of the user equipment 20.

There are many possible specific implementations. For example, a rule-based system may use a knowledge-base to define rules which are associated with varying status levels for each of the criteria being considered. The incentive may be filtered according to preferences of the mobile network operator. Then it is expressed in the form of an offer which, depending on the user's preferences, is communicated to the user for their acceptance.

In case the mobile network operator to switch to is already present in a profile on the embedded identity module in the user equipment 20 of the user, the user may now execute the switch. Alternatively the switch can be triggered by a remote subscription manager.

In case the mobile network operator to switch to is not already present in a profile on the embedded identity module in the user equipment 20 of the user, a remote subscription manager may now download the new profile and the user may then execute the switch. Alternatively the switch can also be triggered by the remote subscription manager.

Alternatively, the profile download can be triggered before or in parallel to the offer being communicated to the user, so the new profile is immediately available after the user has accepted the offer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for dynamically influencing the choice of a mobile network operator profile used by a user equipment connected to a telecommunications network, wherein the user equipment comprises an embedded identity module, wherein a plurality of mobile network operator profiles are able to be used by the user equipment, wherein the plurality of mobile network operator profiles comprises at least a first mobile network operator profile and a second mobile network operator profile, wherein the method comprises the following steps:

defining a plurality of trigger events on an estimated future route of the user equipment and determining a switching probability for each trigger event, the switching probability for a trigger event of the plurality of trigger events corresponding to the probability for the user equipment to switch from the first mobile network operator profile to the second mobile network operator profile, wherein the switching probability and the plurality of trigger events depend on at least one switching parameter associated with the user equipment, wherein the switching parameter depends on the user's contextual needs and/or the user's history of network switching; and transmitting switching-related information to the user equipment based on the plurality of trigger events, the switching-related information comprising information related to either a modification of the first mobile network operator profile or a modification of the second mobile network operator profile, the switching-related information further comprising modified applicable tariffs aimed at either inducing the user equipment to switch from the first mobile network operator profile to the second mobile network operator profile or preventing the user equipment from switching from the first mobile network operator profile to the second mobile network operator profile.

2. The method according to claim 1, wherein the switching probability for each trigger event depends on:
the geographic location of the user equipment; or
the geographic location of the user equipment and the direction of travel of the user equipment; or
characteristics of alternative mobile network operator network connections; or
the differential between characteristics of alternative mobile network operator network connections and current mobile network operator network connections; or
the communication context of the user equipment; or
the past mobile network operator profile switches of the user equipment or of other user equipments.

3. The method according to claim 1, wherein at least part of the trigger events of the plurality of trigger events correspond to the user equipment approaching and/or being close to a territorial border.

4. A system for dynamically influencing the choice of a mobile network operator profile used by a user equipment connected to a telecommunications network, the system comprising:

the user equipment, wherein the user equipment comprises an embedded identity module and is configured to use a plurality of mobile network operator profiles, wherein the plurality of mobile network operator profiles comprises a first mobile network operator profile and a second mobile network operator profile; and a mobile network operator device, configured to:
define a plurality of trigger events on an estimated future route of the user equipment and determine a switching probability for each trigger event, the switching probability for a trigger event of the plurality of trigger events corresponding to the probability for the user equipment to switch from the first mobile network operator profile to the second mobile network operator profile, wherein the switching probability and the plurality of trigger events depend on at least one switching parameter associated with the user equipment, wherein the at least one switching parameter depends on the user's contextual needs and/or the user's history of network switching; and transmit switching-related information to the user equipment based on the plurality of trigger events, the switching-related information comprising information related to either a modification of the first mobile network operator profile or a modification of the second mobile network operator profile, the switching-related information further comprising modified applicable tariffs aimed at either inducing the user equipment to switch from the first mobile network operator profile to the second mobile network operator profile or preventing the user equipment from switching from the first mobile network operator profile to the second mobile network operator profile.

5. The system according to claim 4, wherein the switching probability for each trigger event depends on:
the geographic location of the user equipment; or
the geographic location of the user equipment and the direction of travel of the user equipment; or
characteristics of alternative mobile network operator network connections; or
the differential between characteristics of alternative mobile network operator network connections and current mobile network operator network connections; or
the communication context of the user equipment; or
the past mobile network operator profile switches of the user equipment or of other user equipments.

6. A non-transitory, computer-readable medium having processor-executable instructions stored thereon for dynamically influencing the choice of a mobile network operator profile used by a user equipment connected to a telecommunications network, wherein the processor-executable instructions, when executed by a processor, facilitate performance of the following:

defining a plurality of trigger events on an estimated future route of the user equipment and determining a switching probability for each trigger event, the switching probability for a trigger event of the plurality of trigger events corresponding to the probability for the user equipment to switch from a first mobile network operator profile to a second mobile network operator profile, wherein the switching probability and the plurality of trigger events depend on at least one switching parameter associated with the user equipment, wherein the switching parameter depends on the user's contextual needs and/or the user's history of network switching; and transmitting switching-related information to the user equipment based on the plurality of trigger events, the switching-related information comprising information related to either a modification of the first mobile network operator profile or a modification of the second mobile network operator profile, the switching-related information further comprising modified applicable tariffs aimed at either inducing the user equipment to switch from the first mobile network operator profile to the second mobile network operator profile or preventing the user equipment from switching from the first mobile network operator profile to the second mobile network operator profile.

* * * * *